United States Patent

Hanya

[11] Patent Number: 5,450,885
[45] Date of Patent: Sep. 19, 1995

[54] PNEUMATIC TIRE INCLUDING A TREAD WITH CIRCUMFERENTIAL GROOVES

[75] Inventor: Masahiro Hanya, Kobe, Japan

[73] Assignee: Sumitomo Rubber Industries, Ltd., Hyogo, Japan

[21] Appl. No.: 109,527

[22] Filed: Aug. 20, 1993

[30] Foreign Application Priority Data

Aug. 25, 1992 [JP] Japan .................. 4-250632
Apr. 9, 1993 [JP] Japan .................. 5-107783

[51] Int. Cl.⁶ .............................. B60C 11/13
[52] U.S. Cl. .................................. 152/209 R
[58] Field of Search ............ 152/209 R, 209 D

[56] References Cited

U.S. PATENT DOCUMENTS

| | | | |
|---|---|---|---|
| 3,543,827 | 12/1970 | Roberts et al. | 152/209 R |
| 4,913,207 | 4/1990 | Harakon et al. | 152/209 R |
| 5,000,239 | 3/1991 | Brayer et al. | 152/209 R |
| 5,178,698 | 1/1993 | Shibata | 152/209 R |
| 5,238,038 | 8/1993 | Glover et al. | 152/209 R |

FOREIGN PATENT DOCUMENTS

| | | |
|---|---|---|
| 0292507 | 12/1987 | Japan . |
| 0068406 | 3/1988 | Japan . |
| 3136909 | 6/1991 | Japan . |
| 3186405 | 8/1991 | Japan . |
| 3246104 | 11/1991 | Japan . |
| 2193933 | 2/1988 | United Kingdom . |

*Primary Examiner*—Steven D. Maki
*Attorney, Agent, or Firm*—Birch, Stewart, Kolasch & Birch

[57] ABSTRACT

A pneumatic tire which comprises a tread provided with circumferential grooves extending continuously circumferentially of the tire, in the cross section of the tire including the tire axis, the cross sectional shape of each of the circumferential grooves being composed of a pair of oppositely opposed radially outer portions extending radially inwardly from the tread surface, the outer portions being curved such that the axial width therebetween increases radially outwardly and the inclination angle of each outer portion to the groove center line (CL) increases radially outwardly, whereby running noise, especially air resonance noise and air pumping noise, is reduced.

3 Claims, 6 Drawing Sheets

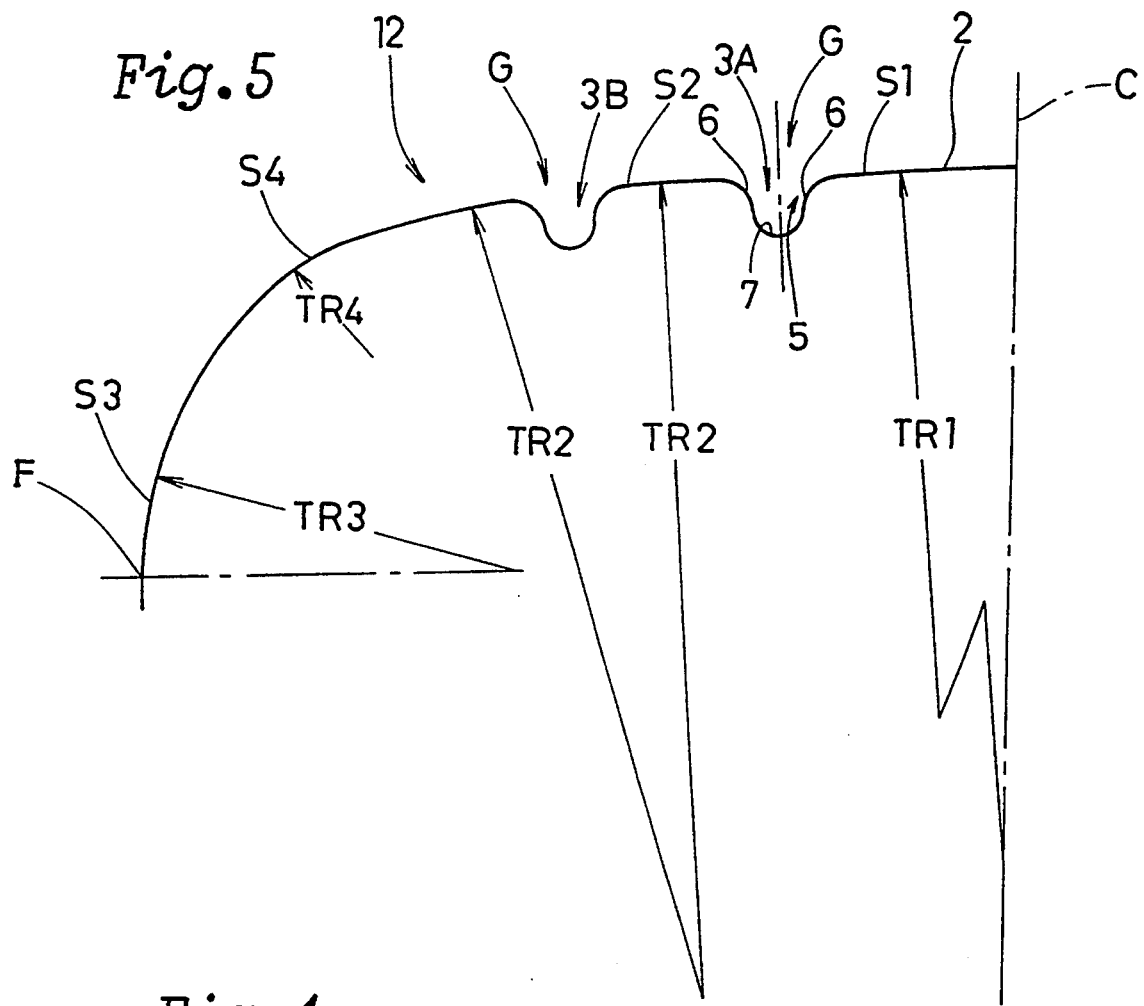
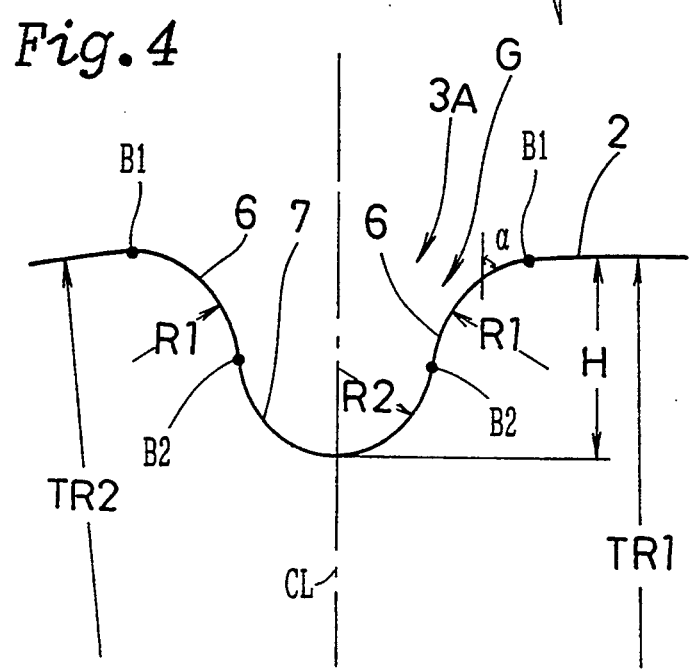

PNEUMATIC TIRE INCLUDING A TREAD WITH CIRCUMFERENTIAL GROOVES

The present invention relates to a pneumatic tire having an improved tread groove which is capable of reducing running noise, especially air resonance noise and air pumping noise.

BACKGROUND OF THE INVENTION

In general, the pneumatic tires are provided in the tread portion with a plurality of main circumferential grooves extending circumferentially of the tire.

According to the recent remarkable improvement in vehicle performances, especially of the passenger cars, the running speed is increased, and a further improved drainage is required for wet performances such as wet grip performance, wet braking performance and the like. Therefore, to meet such requirement, a relatively wide groove having a straight configuration has became used for the circumferential groove.

In such a circumferential groove, as shown in FIG. 8, a trapezoidal cross sectional shape of which the top width WO is slightly wider than the bottom width, has been conventionally employed.

On the other hand, in the ground contacting patch of a tire, an air column is formed in the hollow space surrounded by the circumferential groove wall and the road surface.

In such a ground contacting patch, the main groove which has a conventional trapezoidal cross sectional shape, has a width being almost constant along its longitudinal direction as shown in FIG. 9. Accordingly, the air column is constant in the width and cross sectional shape and area. As a result, resonance is easily caused during running to increase the running noise.

Further, the air which is compressed between the tread surface and the road surface and then discharged through the circumferential groove, makes a so-called pumping noise. Due to the above-explained constant cross sectional area, the flow speed of the discharged air becomes increased in the front and rear edges of the ground contacting patch, which is a main cause of the pumping noise.

According to the use of a straight groove and the increase in the groove width, the air resonance noise and air pumping noise became remarkable.

If the groove width is decreased and a nonlinear groove is used, the noise may be reduced, but wet performances are deteriorated.

SUMMARY OF THE INVENTION

It is therefore, an object of the present invention to provide a pneumatic tire, in which running noise, especially the air resonance noise and air pumping noise is reduced without sacrificing wet performances.

According to one aspect of the present invention, a pneumatic tire comprises a tread provided with circumferential grooves extending continuously circumferentially of the tire,
in the cross section of the tire including the tire axis, the cross sectional shape of each of the circumferential grooves being composed of a pair of oppositely opposed radially outer portions extending radially inwardly from the tread surface,
the outer portions being curved such that the axial width therebetween increases radially outwardly and the inclination angle of each outer portion to the groove center line (CL) increases radially outwardly.

BRIEF DESCRIPTION OF THE DRAWINGS

Embodiments of the present invention will now be described in detail in conjunction with the accompanying drawings.

FIG. 4 is a cross sectional view of another example of the main circumferential groove.

FIG. 5 is a schematic cross sectional view showing another example of the tire profile.

DETAILED DESCRIPTION OF THE EMBODIMENTS

Figure 1:
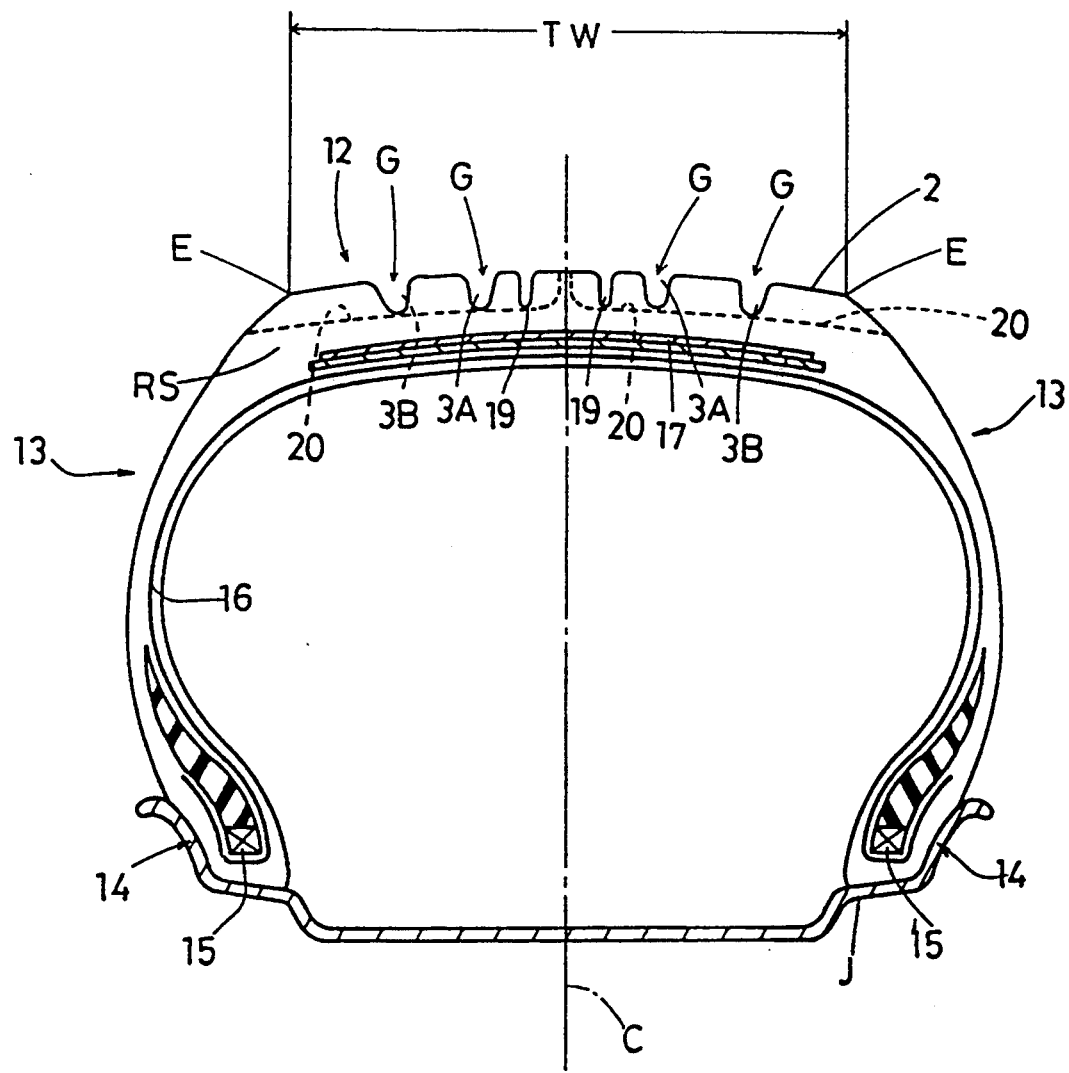
FIG. 1 is a cross sectional view of a tire according to the present invention.
Figure 2:
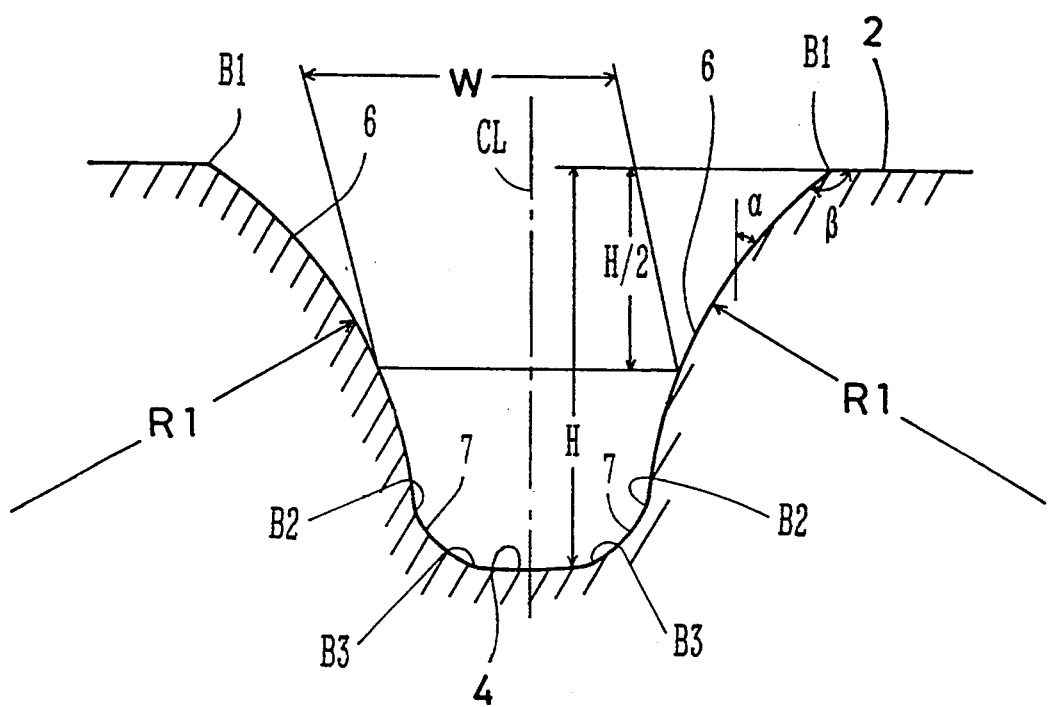
FIG. 2 is a cross sectional view along the axial direction of the tire, of a main circumferential groove.

In FIGS. 1 to 2 showing a first embodiment, a pneumatic tire 1 has a tread portion 12 with a pair of tread edges E, a sidewall portion 13 extending radially inwardly from each tread edge E, and a bead portion 14 located at the radially inner end of each sidewall portion 13 and having a bead core 15 therein.

The pneumatic tire 1 comprises a carcass 16 extending between the bead portions 14 and turned up around the bead cores 15 from the axially inside to outside of the tire, and a belt 17 disposed radially outside the carcass 16 and inside the tread portion 12.

The carcass 16 is composed of at least one ply, in this embodiment only one ply, of cords arranged at an angle of from 70 to 90 degrees with respect to the tire equator C so as to have a radial or a so called semiradial structure. For the carcass cords, organic fiber cords, e.g. nylon, polyester aromatic polyamide and the like are used.

The belt 17 is composed of at least two cross plies, in this embodiment only two plies, of parallel cords laid bias with respect to the tire equator C.

For the belt cords, organic fiber cords, e.g. nylon, polyester, aromatic polyamide and the like, and steel cords can be used.

The tread portion 12 is provided with a plurality of main circumferential grooves G extending continuously circumferentially of the tire.

The main circumferential grooves G in this embodiment are straight grooves extending parallel to the tire equator C, which include a pair of axially inner main circumferential grooves 3A, 3A each disposed on each side of the tire equator C, and a pair of axially outer main circumferential grooves 3B, 3B each disposed between each of the inner main circumferential grooves and one of the tread edges E.

Figure 3:
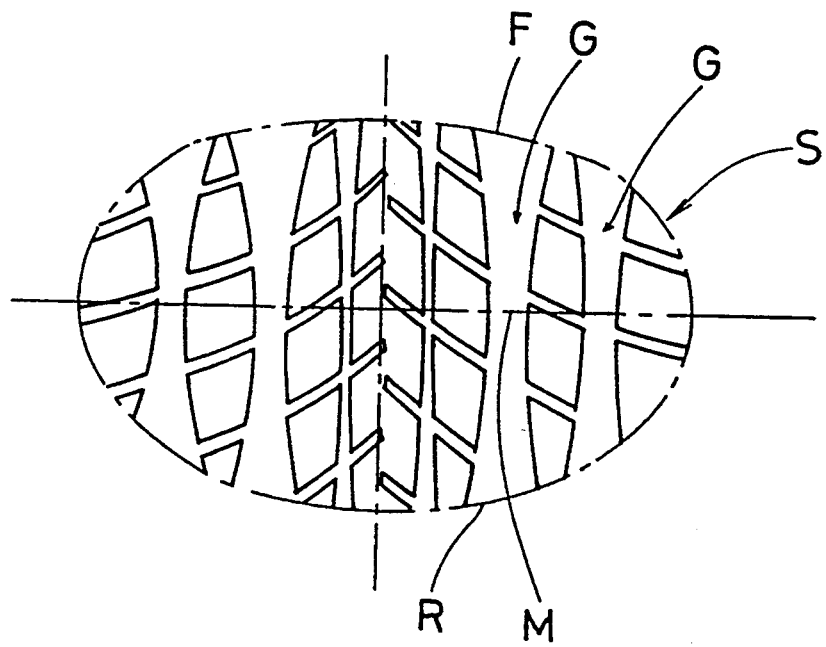
FIG. 3 is a footprint of the tire.
Figure 9:
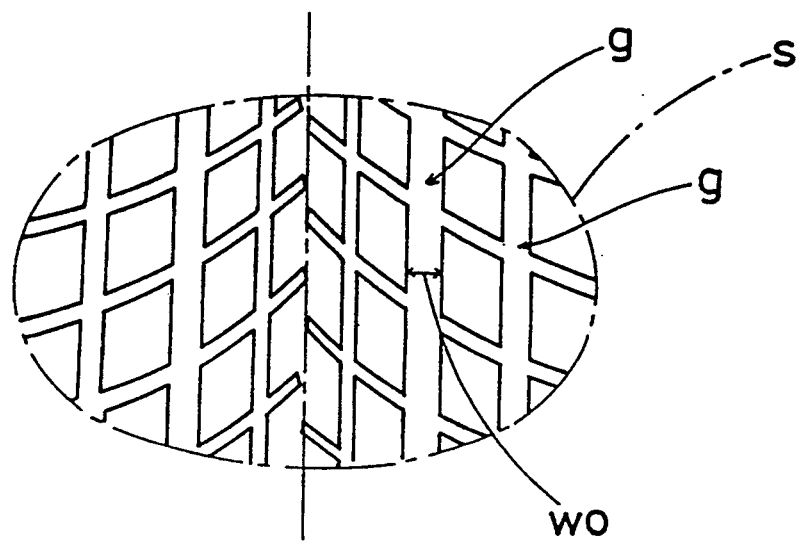
FIG. 9 is a footprint of a tire provided with circumferential grooves having the trapezoidal cross sectional shape.

Further, the tread portion 12 in this embodiment is provided with a narrow circumferential groove 19 between each of the axially inner main circumferential grooves 3A and the tire equator C, and a plurality of axial grooves 20 extending from the tire equator C to the tread edges E, crossing the narrow circumferential groove 19, the axially inner main circumferential groove 3A, and the axially outer main circumferential groove 3B, thereby defining a central rib and rows of blocks as shown in FIG. 3.

In the cross section of the tire including the tire axis, the cross sectional shape of the main circumferential groove G is, as shown in FIG. 2, made up of
a pair of radially outer curved portions 6 extending from a point B1 to a point B2,
a pair of radially inner curved portions 7 extending from the point B2 to a point B3, and
a flat portion 4 extending between the points B3 and B3 one on each side of the center of the groove bottom.

The outer portion 6 is curved convexly such that the more radially outer the position, the larger the inclination angle $\alpha$ to the groove center line CL.

The inner portion 7 is curved concavely, that is, reversely to the outer portion 6.

At the above-mentioned point B1, the outer portion 6 intersects the tread surface 2, and the intersecting angle $\beta$ therebetween is obtuse.

At the point B2, the curve is changed from convex to concave, therefore, the point B2 is an inflection point.

At the point B3, the inner portion 7 is smoothly connected to the flat portion 4, that is, the intersecting angle therebetween is 180 degrees.

The outer portion 6 is made of an arc having a single radius R1, and the inner portion 7 is also made of an arc having a single radius smaller than R1.

FIG. 4 shows a modification of the main circumferential groove G, wherein the cross sectional shape thereof is made up of a pair of radially outer curved portions 6 extending from a point B1 to a point B2, and a radially inner curved portion 7 extending between the points B2 and B2 one on each side of the center of the groove bottom.

The outer portion 6 is curved convexly such that the more radially outer the position, the larger the inclination angle $\alpha$ to the groove center line CL.

The inner portion 7 is curved concavely, that is, reversely to the outer portion 6.

At the above-mentioned point B1, the outer portion 6 is smoothly connected to the tread surface 2, that is, the intersecting angle therebetween is 180 degrees.

At the point B2, the curve is changed from convex to concave, therefore, the point B2 is an inflection point.

In this example, the cross sectional shape includes no flat portion.

The outer portion 6 is made of an arc having a single radius R1. The inner portion 7 is also made of an arc having a single radius R2 smaller than R1 and having a center on the center line CL.

FIG. 5 shows an example profile for the tire in which the main circumferential groove G of FIG. 4 is used. In this example, four main circumferential grooves G (3A and 3B) are provided similarly to the former example, but the narrow circumferential grooves 19 are not provided.

In FIG. 5 showing one half of the tire profile between the tire equator C and the maximum cross sectional width point F of the tire, the profile is made of a multi-radius curve consisting of a central part S1 with a radius TR1 extending from the tire equator C to the inner groove 3A, a lateral part S2 with a radius TR2 extending from the inner groove 3A to a position in the shoulder region of the tire, a shoulder part S4 with a radius TR4 extending axially outwardly from the axially outer end of the lateral part S2, and an upper sidewall part S3 with a radius TR3 extending from the axially outer end of the lateral part S4 to the maximum tire cross sectional width point F. As a result, the tire has a rounded shoulder.

In a tire size of 225/50VR16, for example, the above mentioned radii and the depth H of the main circumferential grooves G are as follows:

| | |
|---|---|
| TR1 | 1000 mm |
| TR2 | 300 mm |
| TR3 | 60 mm |
| TR4 | 25 mm |
| R1 | 5 mm |
| R2 | 4 mm |
| H | 8.2 mm |

The above-mentioned depth H of the main circumferential grooves G is preferably in the range of from 6 to 14% of the tread width TW.

Here, the depth H is a radial distance from the groove top to the deepest point of the groove bottom.

The tread width TW is the axial distance between the tread edges E and E.

If the tread edge E is not defined distinctly due to the rounded shoulder profile as explained in the later example, the tread width TW is defined by the ground contact width under the normal loaded state in which the tire is mounted on its regular rim J and inflated to its regular pressure and then loaded with its regular load.

Here, the regular rim J is a rim officially approved for the tire by TRA, and the regular inner pressure and the regular load are the maximum air pressure and the maximum tire load for the tire officially specified in Airpressure/Maximum-load Table by the same associations.

The above-mentioned radius R1 of the single radius arc of the outer curved portions 6 is set in the range of from 0.5 to 1.5 times the groove depth H.

If the radius R1 is less than 0.5 times the depth H, the noise can not be effectively reduced. If the radius R1 is more than 1.5 times the depth H, the total actual ground contacting area is liable to excessively decrease, and traction and braking force especially in a wet condition become insufficient. Further, the tread wear resistance and durability are deteriorated.

With regard to the radially inward extent of the radially outer portion 6, the above-mentioned point B2 is preferably located radially inward of a radial position corresponding to a ½ of the groove depth H.

While due to the above explained groove cross sectional shape, the width of the main circumferential groove G increases gradually from the groove bottom to the groove top, the width W at a ½ of the groove depth H is preferably set in the range of from 4 to 10% of the tread width TW. If the width W is less than 4% of the tread width TW, the drainage is decreased to deteriorate wet performances. If the width W is more than 10%, small objects such as stones and the like are liable to be entrapped in the groove, and the under tread is liable to be damaged.

Figure 8:
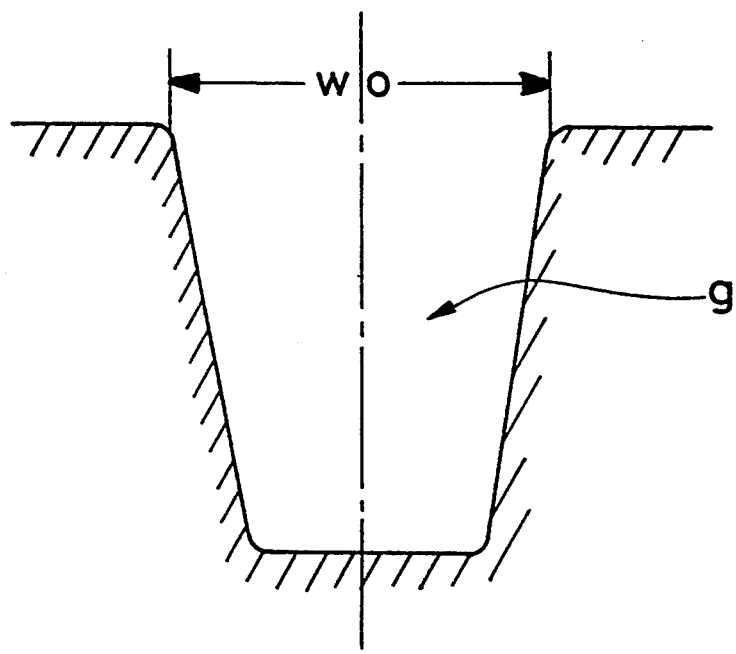
FIG. 8 is a cross sectional view showing a conventionally employed trapezoidal groove cross sectional shape.

In a narrow circumferential groove such as the groove 19 of the former example, the above-explained cross sectional shapes for the main circumferential groove G can be employed. However, if the groove width is so small that air resonance and/or air pumping cannot occur, a shape which consists of flat side faces as shown in FIG. 8 may be employed.

In the axial grooves, the above-explained cross sectional shapes for the main circumferential groove G may be employed, but are generally not employed. Preferably, a shape which consists of flat side faces as shown in FIG. 8 is employed.

In the present invention, the main circumferential grooves G can be formed in a zigzag or wavy configuration in addition to the above-mentioned straight configuration. Further, in each curved portion, various curves, e.g. an involute curve, a curve of part of an ellipse and the like can be used in addition to the single radius arc.

As described above, in the pneumatic tire according to the present invention, the main circumferential groove has a cross sectional shape composed of the radially outer curved portions.

Figure 7:
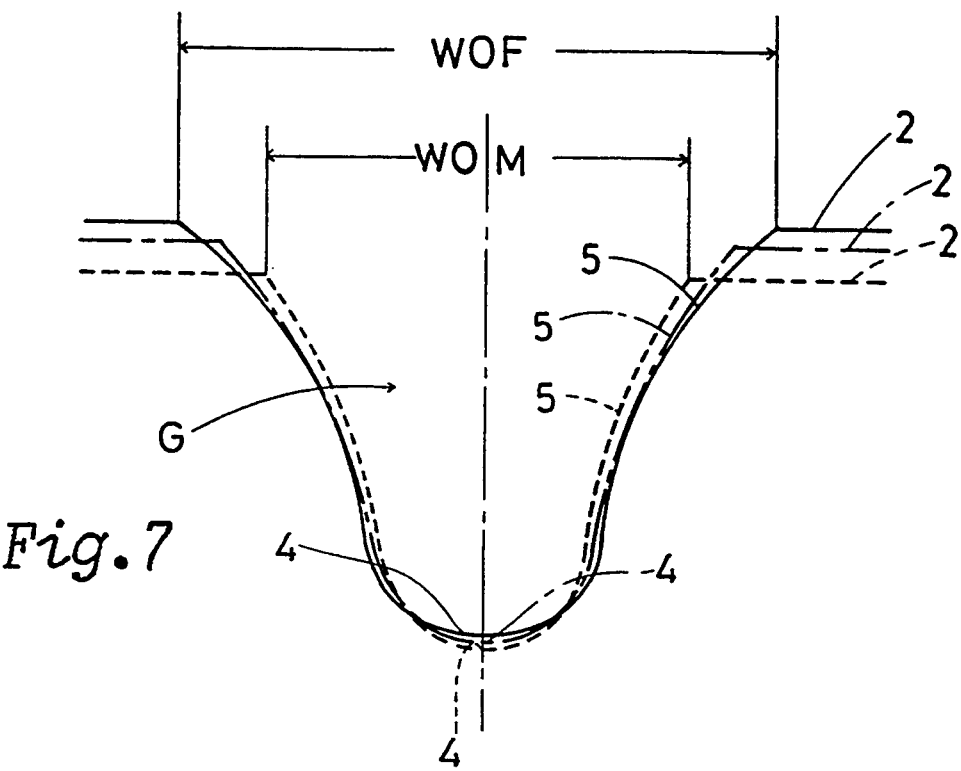
FIG. 7 is a cross sectional view explaining the deformation of the main circumferential groove due to ground contact.
Figure 6:
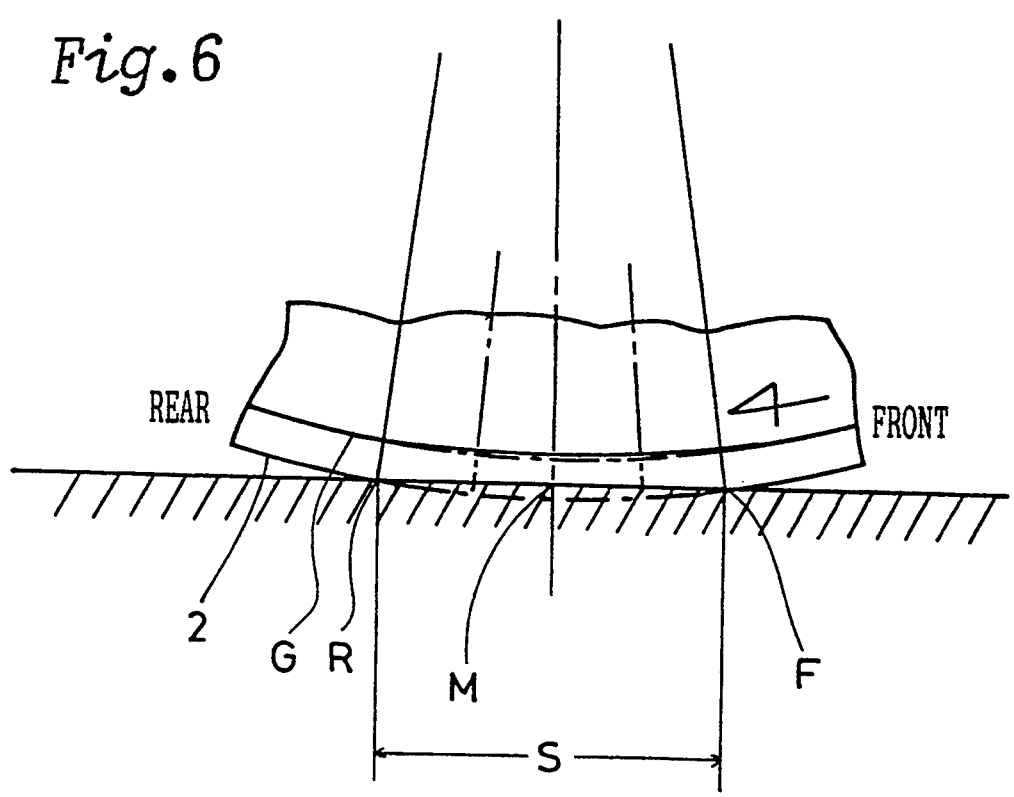
FIG. 6 is a schematic sectional view of the tire taken along the circumferential direction thereof showing the ground contacting patch.

Accordingly, in the ground contact patch S, the ground pressure decreases towards the front edge F and the rear edge R from the midposition M as shown in FIG. 6, and the main circumferential groove G changes its cross sectional shape as shown in FIG. 7, in which the shape at the edges F and R is indicated by solid line, the shape at the midposition M by broken line, and the shape therebetween by chain line.

As a result, in the ground contracting patch S, the groove width is changed: Maximum value (WOF)-→Minimum value (WOM)→Maximum value (WOF).

Therefore, as shown in FIG. 3 showing the footprint of the tire, the configuration of the main groove G on the road surface is flared towards both the front direction and rear direction.

Accordingly, the cross sectional area of the main groove G is increased from the midposition M towards both sides thereof in the circumferential direction of the tire at a larger rate than the conventionally used trapezoidal cross sectional shape.

As a result, the speed of air flow towards the front and rear edges F and R from the midposition M is decreased in the flared edge portions, and the air pumping noise is effectively reduced.

Further, as the groove cross sectional area is greatly changed in the longitudinal direction thereof, the occurrence of the standing wave which causes the air resonance noise is effectively prevented. Therefore, the air resonance noise is effectively reduced.

The present invention can be applied to various tires, but suitably applied to passenger car tires.

I claim:

1. A pneumatic tire comprising a tread, said tread provided with circumferential grooves extending continuously circumferentially of the tire,
   in the cross section of the tire including the tire axis, the cross sectional shape of each said circumferential groove consists of
   a pair of oppositely opposed radially outer portions (6) extending radially inwardly from the tread surface,
   a flat base portion (4) centered on the groove center line (CL), and
   a pair of oppositely opposed radially inner portions (7) each extending between each said radially outer portion (6) and the flat base portion (4),
   the outer portions (6) curved such that the axial width therebetween increases radially outwardly, and the inclination angle ($\alpha$) of each outer portion (6) to the groove center line (CL) increases radially outwardly,
   the inner portions (7) curved reversely to the outer portions (6),
   each of the radially outer portions (6) having a first radius (R1) and each of the radially inner portions (7) having a second radius being smaller than said first radius (R1),
   each of the radially outer portions (6) intersecting the tread surface to form an angled corner (B1) having an obtuse angle,
   each of the circumferential grooves having a depth (H) of from 6 to 14% of the tread width and a width of from 4 to 10% of the tread width at 50% of said depth, and
   the radially inner end (B2) of each said outer portion (6) located radially inward of 50% of the groove depth, wherein
   each of the radially outer portions (6) has a single radius curve with said first radius (R1) being in the range of from 0.5 to 1.5 times the depth H of the circumferential grooves.

2. The pneumatic tire according to claim 1, wherein each of the radially inner portions (7) has a single radius curve.

3. The pneumatic tire according to claim 1, wherein each of the radially outer portions (6) is connected with one of the radially inner portions (7) without forming any angle therebetween.

* * * * *